(12) United States Patent
Young

(10) Patent No.: US 10,671,761 B2
(45) Date of Patent: *Jun. 2, 2020

(54) GROUP BASED COMPLETE AND INCREMENTAL COMPUTER FILE BACKUP SYSTEM, PROCESS AND APPARATUS

(71) Applicant: Hybir Inc., Austin, TX (US)

(72) Inventor: Hadley Rasch Young, Littleton, CO (US)

(73) Assignee: Hybir Inc., Littleton, CO (US)

( * ) Notice: Subject to any disclaimer, the term of this patent is extended or adjusted under 35 U.S.C. 154(b) by 505 days.

This patent is subject to a terminal disclaimer.

(21) Appl. No.: 15/491,294

(22) Filed: Apr. 19, 2017

(65) Prior Publication Data

US 2017/0220820 A1   Aug. 3, 2017

Related U.S. Application Data

(63) Continuation of application No. 14/690,077, filed on Apr. 17, 2015, now Pat. No. 9,679,146, which is a
(Continued)

(51) Int. Cl.
*G06F 16/00* (2019.01)
*G06F 21/64* (2013.01)
(Continued)

(52) U.S. Cl.
CPC .......... *G06F 21/64* (2013.01); *G06F 11/1004* (2013.01); *G06F 11/1451* (2013.01);
(Continued)

(58) Field of Classification Search
CPC ............................... G06F 16/27; G06F 16/178
(Continued)

(56) References Cited

U.S. PATENT DOCUMENTS

| 3,668,647 A | 6/1972 | Evangelisti et al. |
| 4,215,402 A | 7/1980 | Mitchell et al. |

(Continued)

FOREIGN PATENT DOCUMENTS

| EP | 0774715 | 5/1997 |
| EP | 1049988 | 11/2000 |

(Continued)

OTHER PUBLICATIONS

Altiris, Inc., "White Paper: Protecting Data Assets with Altiris Client Recovery Solution", TechTarget and Networld World , May 22, 2003, pp. 1-13.

(Continued)

*Primary Examiner* — Chelcie L Daye
(74) *Attorney, Agent, or Firm* — Sheridan Ross P.C.

(57) ABSTRACT

The present invention is capable of determining the rights to a file based on providing a descriptor. The descriptor can be calculated using an algorithm, which may be cryptographic and/or non-cryptographic. The descriptor may further be based on the file contents, metadata of the file, other file data, or any combination thereof to uniquely identify the file in a shared file repository. Since the descriptor is generated based on file data it will be the same regardless of which user generates it. Accordingly, only one copy of the file needs to be maintained in the shared file repository, thereby reducing the amount of network bandwidth required to assure the file is backed up and further reducing the amount of storage required to backup the files. This results in a vastly more efficient method of backup in terms of processing time, network bandwidth, and storage requirements.

13 Claims, 6 Drawing Sheets

Related U.S. Application Data continuation of application No. 13/236,257, filed on Sep. 19, 2011, now Pat. No. 9,037,545, which is a continuation of application No. 11/744,741, filed on May 4, 2007, now Pat. No. 8,051,043.

(60) Provisional application No. 60/746,607, filed on May 5, 2006.

(51) Int. Cl.

| | |
|---|---|
| *G06F 16/13* | (2019.01) |
| *G06F 16/27* | (2019.01) |
| *G06F 16/11* | (2019.01) |
| *G06F 16/178* | (2019.01) |
| *G06F 11/14* | (2006.01) |
| *G06F 11/10* | (2006.01) |
| *G06F 21/60* | (2013.01) |
| *H04L 29/08* | (2006.01) |
| *H04L 9/32* | (2006.01) |
| *H04L 29/06* | (2006.01) |

(52) U.S. Cl.
CPC ...... *G06F 11/1453* (2013.01); *G06F 11/1464* (2013.01); *G06F 16/113* (2019.01); *G06F 16/13* (2019.01); *G06F 16/178* (2019.01); *G06F 16/27* (2019.01); *G06F 21/602* (2013.01); *H04L 9/3247* (2013.01); *H04L 63/0428* (2013.01); *H04L 67/1095* (2013.01); *G06F 2201/80* (2013.01)

(58) Field of Classification Search
USPC ......................................................... 707/646
See application file for complete search history.

(56) References Cited

U.S. PATENT DOCUMENTS

| | | |
|---|---|---|
| 4,404,676 A | 9/1983 | DeBenedictis |
| 4,625,076 A | 11/1986 | Okamoto et al. |
| 4,641,274 A | 2/1987 | Swank |
| 4,649,479 A | 3/1987 | Advani et al. |
| 4,698,628 A | 10/1987 | Herkert et al. |
| 4,761,785 A | 8/1988 | Clark et al. |
| 4,864,616 A | 9/1989 | Pond et al. |
| 4,887,204 A | 12/1989 | Johnson et al. |
| 4,887,235 A | 12/1989 | Holloway et al. |
| 4,897,781 A | 1/1990 | Chang et al. |
| 4,901,223 A | 2/1990 | Rhyne |
| 4,929,946 A | 5/1990 | O'Brien et al. |
| 4,933,970 A | 6/1990 | Shamir |
| 4,982,324 A | 1/1991 | McConaughy et al. |
| 5,005,122 A | 4/1991 | Griffin et al. |
| 5,016,009 A | 5/1991 | Whiting et al. |
| 5,018,060 A | 5/1991 | Gelb et al. |
| 5,089,958 A | 2/1992 | Horton et al. |
| 5,109,515 A | 4/1992 | Laggis et al. |
| 5,126,739 A | 6/1992 | Whiting et al. |
| 5,133,065 A | 7/1992 | Cheffetz et al. |
| 5,140,321 A | 8/1992 | Jung |
| 5,146,568 A | 9/1992 | Flaherty et al. |
| 5,155,835 A | 10/1992 | Belsan |
| 5,162,986 A | 11/1992 | Graber et al. |
| 5,163,148 A | 11/1992 | Walls |
| 5,210,866 A | 5/1993 | Milligan et al. |
| 5,218,695 A | 6/1993 | Noveck et al. |
| 5,235,623 A | 8/1993 | Sugiyama et al. |
| 5,239,637 A | 8/1993 | Davis et al. |
| 5,239,647 A | 8/1993 | Anglin et al. |
| 5,239,659 A | 8/1993 | Rudeseal et al. |
| 5,263,154 A | 11/1993 | Eastridge et al. |
| 5,276,860 A | 1/1994 | Fortier et al. |
| 5,276,867 A | 1/1994 | Kenley et al. |
| 5,278,838 A | 1/1994 | Ng et al. |
| 5,281,967 A | 1/1994 | Jung |
| 5,305,389 A | 4/1994 | Palmer |
| 5,317,728 A | 5/1994 | Tevis et al. |
| 5,325,505 A | 6/1994 | Hoffecker et al. |
| 5,347,653 A | 9/1994 | Flynn et al. |
| 5,355,453 A | 10/1994 | Row et al. |
| 5,367,637 A | 11/1994 | Wei |
| 5,367,698 A | 11/1994 | Webber et al. |
| 5,379,418 A | 1/1995 | Shimazaki et al. |
| 5,403,639 A | 4/1995 | Belsan et al. |
| 5,404,508 A | 4/1995 | Konrad et al. |
| 5,404,527 A | 4/1995 | Irwin et al. |
| 5,406,279 A | 4/1995 | Anderson et al. |
| RE34,954 E | 5/1995 | Haber et al. |
| 5,448,718 A | 9/1995 | Cohn et al. |
| 5,452,440 A | 9/1995 | Salsburg |
| 5,452,454 A | 9/1995 | Basu |
| 5,454,099 A | 9/1995 | Myers et al. |
| 5,479,654 A | 12/1995 | Squibb |
| 5,487,160 A | 1/1996 | Bemis |
| 5,497,423 A | 3/1996 | Miyaji |
| 5,497,483 A | 3/1996 | Beardsley et al. |
| 5,513,314 A | 4/1996 | Kandasamy et al. |
| 5,515,502 A | 5/1996 | Wood |
| 5,521,597 A | 5/1996 | Dimitri |
| 5,524,205 A | 6/1996 | Lomet et al. |
| 5,535,407 A | 7/1996 | Yanagawa et al. |
| 5,544,320 A | 8/1996 | Konrad |
| 5,559,991 A | 9/1996 | Kanfi |
| 5,574,906 A | 11/1996 | Morris |
| 5,586,322 A | 12/1996 | Beck et al. |
| 5,594,227 A | 1/1997 | Deo |
| 5,604,862 A | 2/1997 | Midgely et al. |
| 5,606,719 A | 2/1997 | Nichols et al. |
| 5,640,561 A | 6/1997 | Satoh et al. |
| 5,649,196 A | 7/1997 | Woodhill et al. |
| 5,659,743 A | 8/1997 | Adams et al. |
| 5,659,747 A | 8/1997 | Nakajima |
| 5,696,901 A | 12/1997 | Konrad |
| 5,742,811 A | 4/1998 | Agrawal et al. |
| 5,751,936 A | 5/1998 | Larson et al. |
| 5,754,844 A | 5/1998 | Fuller |
| 5,765,152 A | 6/1998 | Erickson |
| 5,765,173 A | 6/1998 | Cane et al. |
| 5,771,354 A | 6/1998 | Crawford |
| 5,778,395 A | 7/1998 | Whiting et al. |
| 5,781,901 A | 7/1998 | Kuzma |
| 5,787,178 A | 7/1998 | Schwenk |
| 5,794,254 A | 8/1998 | McClain |
| 5,802,264 A | 9/1998 | Chen et al. |
| 5,802,297 A | 9/1998 | Engquist |
| 5,831,558 A | 11/1998 | Harvell |
| 5,850,565 A | 12/1998 | Wightman |
| 5,914,938 A | 6/1999 | Brady et al. |
| 5,915,024 A | 6/1999 | Kitaori et al. |
| 5,915,025 A | 6/1999 | Taguchi et al. |
| 5,933,104 A | 8/1999 | Kimura |
| 5,978,791 A | 11/1999 | Farber et al. |
| 5,990,810 A | 11/1999 | Williams |
| 6,014,676 A | 1/2000 | McClain |
| 6,016,553 A | 1/2000 | Schneider et al. |
| 6,029,168 A | 2/2000 | Frey |
| 6,044,220 A | 3/2000 | Breternitz, Jr. |
| 6,052,688 A | 4/2000 | Thorsen |
| 6,085,298 A | 7/2000 | Ohran |
| 6,122,754 A | 9/2000 | Litwin et al. |
| 6,141,421 A | 10/2000 | Takaragi et al. |
| 6,148,342 A | 11/2000 | Ho |
| 6,170,744 B1 | 1/2001 | Lee et al. |
| 6,205,533 B1 | 3/2001 | Margolus |
| 6,219,423 B1 | 4/2001 | Davis |
| 6,268,809 B1 | 7/2001 | Saito |
| 6,272,492 B1 | 8/2001 | Kay |
| 6,307,487 B1 | 10/2001 | Luby |
| 6,308,325 B1 | 10/2001 | Dobbek |
| 6,320,520 B1 | 11/2001 | Luby |
| 6,374,266 B1 | 4/2002 | Shnelyar |
| 6,377,907 B1 | 4/2002 | Waclawski |
| 6,388,586 B1 | 5/2002 | Fischer et al. |

(56) References Cited

U.S. PATENT DOCUMENTS

| | | |
|---|---|---|
| 6,415,280 B1 | 7/2002 | Farber et al. |
| 6,415,302 B1 | 7/2002 | Garthwaite et al. |
| 6,430,618 B1 | 8/2002 | Karger et al. |
| 6,513,050 B1 | 1/2003 | Williams et al. |
| 6,526,418 B1 | 2/2003 | Midgley et al. |
| 6,532,542 B1 | 3/2003 | Thomlinson et al. |
| 6,535,867 B1 | 3/2003 | Waters |
| 6,535,894 B1 | 3/2003 | Schmidt et al. |
| 6,549,992 B1 | 4/2003 | Armangau et al. |
| 6,553,494 B1 | 4/2003 | Glass |
| 6,557,102 B1 | 4/2003 | Wong et al. |
| 6,625,625 B1 | 9/2003 | Kihara et al. |
| 6,671,703 B2 | 12/2003 | Thompson et al. |
| 6,704,730 B2 | 3/2004 | Moulton et al. |
| 6,785,786 B1 * | 8/2004 | Gold .................. G06F 11/1469 711/162 |
| 6,810,398 B2 | 10/2004 | Moulton |
| 6,828,925 B2 | 12/2004 | McCanne et al. |
| 6,865,655 B1 | 3/2005 | Andersen |
| 6,901,513 B1 | 5/2005 | Schwenk et al. |
| 6,915,302 B1 | 7/2005 | Christofferson et al. |
| 6,928,526 B1 | 8/2005 | Zhu |
| 6,959,369 B1 | 10/2005 | Ashton et al. |
| 6,961,009 B2 | 11/2005 | McCanne et al. |
| 6,976,089 B2 | 12/2005 | Na et al. |
| 6,981,138 B2 | 12/2005 | Douceur et al. |
| 6,988,124 B2 | 1/2006 | Douceur et al. |
| 7,002,493 B2 | 2/2006 | Ng et al. |
| 7,020,665 B2 | 3/2006 | Douceur et al. |
| 7,039,634 B2 | 5/2006 | Xu et al. |
| 7,043,470 B2 | 5/2006 | Xu et al. |
| 7,047,420 B2 | 5/2006 | Douceur et al. |
| 7,055,008 B2 | 5/2006 | Niles et al. |
| 7,062,490 B2 | 6/2006 | Adya et al. |
| 7,079,053 B2 | 7/2006 | Kolavi |
| 7,116,249 B2 | 10/2006 | McCanne et al. |
| 7,120,666 B2 | 10/2006 | McCanne et al. |
| 7,124,305 B2 | 10/2006 | Margolus et al. |
| 7,152,220 B2 | 12/2006 | Rickards et al. |
| 7,200,618 B2 | 4/2007 | Douceur et al. |
| 7,225,185 B2 | 5/2007 | Hasegawa |
| 7,239,581 B2 | 7/2007 | Delgado et al. |
| 7,240,060 B2 | 7/2007 | Adya et al. |
| 7,263,521 B2 | 8/2007 | Carpentier et al. |
| 7,269,689 B2 | 9/2007 | Eshghi et al. |
| 7,272,602 B2 | 9/2007 | Moulton |
| 7,272,630 B2 | 9/2007 | Douceur et al. |
| 7,272,666 B2 | 9/2007 | Rowan et al. |
| 7,287,030 B2 | 10/2007 | Margolus et al. |
| 7,287,133 B2 | 10/2007 | Rowan et al. |
| 7,296,008 B2 | 11/2007 | Passerini et al. |
| 7,299,250 B2 | 11/2007 | Douceur et al. |
| 7,304,994 B2 | 12/2007 | Dubnicki et al. |
| 7,310,644 B2 | 12/2007 | Adya et al. |
| 7,318,100 B2 | 1/2008 | Demmer et al. |
| 7,321,322 B2 | 1/2008 | Helfman et al. |
| 7,346,774 B2 | 3/2008 | Douceur et al. |
| 7,356,701 B2 | 4/2008 | Margolus et al. |
| 7,359,937 B2 | 4/2008 | Douceur et al. |
| 7,363,326 B2 | 4/2008 | Margolus |
| 7,366,859 B2 | 4/2008 | Per et al. |
| 7,373,345 B2 | 5/2008 | Carpentier et al. |
| 7,379,940 B1 | 5/2008 | Baron |
| 7,398,283 B2 | 7/2008 | Margolus et al. |
| 7,401,220 B2 | 7/2008 | Bolosky et al. |
| 7,409,587 B2 | 8/2008 | Perry |
| 7,412,462 B2 | 8/2008 | Margolus et al. |
| 7,415,608 B2 | 8/2008 | Bolosky et al. |
| 7,421,433 B2 | 9/2008 | Xu et al. |
| 7,424,498 B1 | 9/2008 | Patterson |
| 7,428,573 B2 | 9/2008 | McCanne et al. |
| 7,444,387 B2 | 10/2008 | Douceur et al. |
| 7,451,168 B1 | 11/2008 | Patterson |
| 7,454,612 B2 | 11/2008 | Bolosky et al. |
| 7,457,800 B2 | 11/2008 | Margolus et al. |
| 7,457,813 B2 | 11/2008 | Margolus et al. |
| 7,457,934 B2 | 11/2008 | Yagawa |
| 7,457,959 B2 | 11/2008 | Margolus et al. |
| 7,467,144 B2 | 12/2008 | Margolus |
| 7,475,258 B2 | 1/2009 | Douceur et al. |
| 7,477,166 B2 | 1/2009 | McCanne et al. |
| 7,478,243 B2 | 1/2009 | Bolosky et al. |
| 7,487,245 B2 | 2/2009 | Douceur et al. |
| 7,496,555 B2 | 2/2009 | Margolus |
| 7,505,970 B2 | 3/2009 | Adya et al. |
| 7,506,173 B2 | 3/2009 | Margolus et al. |
| 7,509,420 B2 | 3/2009 | Moulton et al. |
| 7,509,423 B2 | 3/2009 | Douceur et al. |
| 7,523,098 B2 | 4/2009 | Hirsch et al. |
| 7,536,583 B2 | 5/2009 | Passerini et al. |
| 7,539,867 B2 | 5/2009 | Bolosky et al. |
| 7,539,871 B1 | 5/2009 | Osborn |
| 7,555,531 B2 | 6/2009 | Teodosiu et al. |
| 7,555,656 B2 | 6/2009 | Douceur et al. |
| 7,558,856 B2 | 7/2009 | Moulton et al. |
| 7,571,186 B2 | 8/2009 | Douceur et al. |
| 7,571,327 B2 | 8/2009 | Douceur et al. |
| 7,574,418 B1 | 8/2009 | Patterson et al. |
| 7,577,101 B1 | 8/2009 | Choiniere et al. |
| 7,577,806 B2 | 8/2009 | Rowan et al. |
| 7,577,807 B2 | 8/2009 | Rowan et al. |
| 7,584,337 B2 | 9/2009 | Rowan et al. |
| 7,584,338 B1 | 9/2009 | Bricker et al. |
| 7,587,426 B2 | 9/2009 | Fujiwara et al. |
| 7,587,617 B2 | 9/2009 | Margolus et al. |
| 7,613,775 B2 | 11/2009 | Greaves et al. |
| 7,613,787 B2 | 11/2009 | Manasse et al. |
| 7,627,652 B1 | 12/2009 | Commons et al. |
| 7,631,120 B2 | 12/2009 | Darcy |
| 7,647,362 B1 | 1/2010 | Nachenberg |
| 7,650,416 B2 | 1/2010 | Wu et al. |
| 7,657,931 B2 | 2/2010 | Margolus et al. |
| 7,660,836 B2 | 2/2010 | Bolik et al. |
| 7,664,824 B2 | 2/2010 | Kobayashi et al. |
| 7,676,509 B2 | 3/2010 | Swanepoel et al. |
| 7,685,096 B2 | 3/2010 | Margolus et al. |
| 7,685,415 B2 | 3/2010 | Douceur et al. |
| 7,685,459 B1 | 3/2010 | Spiegeleer et al. |
| 7,689,633 B1 | 3/2010 | Li et al. |
| 7,693,814 B2 | 4/2010 | Margolus et al. |
| 7,707,166 B1 | 4/2010 | Patterson |
| 7,725,667 B2 | 5/2010 | Rowan et al. |
| 7,725,760 B2 | 5/2010 | Rowan et al. |
| 7,730,222 B2 | 6/2010 | Passerini |
| 7,734,595 B2 | 6/2010 | Margolus |
| 7,734,598 B2 | 6/2010 | Noguchi et al. |
| 7,734,603 B1 | 6/2010 | McManis |
| 7,747,581 B1 | 6/2010 | Hugo et al. |
| 7,747,582 B1 | 6/2010 | Kaminski |
| 7,747,586 B2 | 6/2010 | Kaczmarski et al. |
| 7,747,635 B1 | 6/2010 | Swidler et al. |
| 7,752,171 B2 | 7/2010 | Spiegeleer |
| 7,761,766 B2 | 7/2010 | Boldt et al. |
| 7,770,023 B2 | 8/2010 | Douceur et al. |
| 7,783,682 B1 | 8/2010 | Patterson |
| 7,792,810 B1 | 9/2010 | Kaminski |
| 7,801,868 B1 | 9/2010 | Kaminski |
| 7,801,871 B2 | 9/2010 | Gosnell |
| 7,814,070 B1 | 10/2010 | Kaminski |
| 7,814,129 B2 | 10/2010 | Williams |
| 7,814,553 B2 | 10/2010 | Kawabata et al. |
| 7,827,362 B2 | 11/2010 | Passerini |
| 7,831,793 B2 | 11/2010 | Chakravarty et al. |
| 7,840,540 B2 | 11/2010 | Kaminski |
| 7,844,652 B2 | 11/2010 | Li et al. |
| 7,849,134 B2 | 12/2010 | McCanne et al. |
| 7,849,462 B2 | 12/2010 | Traut et al. |
| 7,860,843 B2 | 12/2010 | Dodd et al. |
| 7,870,218 B2 | 1/2011 | Dubnicki et al. |
| 7,886,364 B2 | 2/2011 | Douceur et al. |
| 7,895,224 B2 | 2/2011 | Carpentier et al. |
| 7,900,052 B2 | 3/2011 | Jonas |
| 7,904,428 B2 | 3/2011 | Perry et al. |
| 7,904,488 B2 | 3/2011 | Hood |

(56) References Cited

U.S. PATENT DOCUMENTS

| | | | |
|---|---|---|---|
| 7,912,855 B2 | 3/2011 | Margolus | |
| 7,913,052 B2 | 3/2011 | Yagawa | |
| 7,930,315 B2 | 4/2011 | Margolus | |
| 7,949,824 B2 | 5/2011 | Zhu | |
| 7,953,869 B2 | 5/2011 | Demmer et al. | |
| 7,954,157 B2 | 5/2011 | Niles et al. | |
| 7,983,301 B2 | 7/2011 | Li | |
| 7,991,748 B2 | 8/2011 | Rowan et al. | |
| 8,028,009 B1 | 9/2011 | Patterson | |
| 8,051,043 B2 | 11/2011 | Young | |
| 8,051,252 B2 | 11/2011 | Williams | |
| 8,073,926 B2 | 12/2011 | Traut et al. | |
| 8,078,930 B2 | 12/2011 | Boldt et al. | |
| 8,112,452 B2 | 2/2012 | Adya et al. | |
| 8,112,496 B2 | 2/2012 | Manasse et al. | |
| 8,117,173 B2 | 2/2012 | Gurevich et al. | |
| 9,037,545 B2 | 5/2015 | Young | |
| 9,679,146 B2 | 6/2017 | Young | |
| 2004/0073797 A1* | 4/2004 | Fascenda | H04L 9/3234 713/171 |
| 2004/0143713 A1 | 7/2004 | Niles | |
| 2005/0172123 A1* | 8/2005 | Carpentier | G06F 21/64 713/165 |
| 2005/0246398 A1* | 11/2005 | Barzilai | G06F 11/1448 |
| 2006/0021878 A1 | 2/2006 | Lu et al. | |
| 2006/0059207 A1 | 3/2006 | Hirsch | |
| 2007/0061385 A1* | 3/2007 | Clark | G06F 11/1448 |
| 2007/0130229 A1* | 6/2007 | Anglin | G06F 16/40 |
| 2007/0198609 A1* | 8/2007 | Black | G06Q 10/087 |
| 2011/0231367 A1 | 9/2011 | Niles et al. | |

FOREIGN PATENT DOCUMENTS

| | | |
|---|---|---|
| EP | 1049989 | 11/2000 |
| EP | 1349068 | 10/2003 |
| GB | 2264423 | 8/2003 |
| JP | H07-028682 | 1/1995 |
| KR | 1020050034508 | 4/2005 |
| WO | WO 96/25801 | 8/1996 |
| WO | WO 99/09480 | 2/1999 |
| WO | WO 99/12098 | 3/1999 |
| WO | WO 2001/018633 | 3/2001 |
| WO | WO 2001/061563 | 8/2001 |
| WO | WO 01/65371 | 9/2001 |
| WO | WO 2004/099993 | 11/2004 |

OTHER PUBLICATIONS

Author Unknown, Altiris Recovery Solution: Protect your Organisations Data, date unknown, p. 1, available at http://www.codework.com/backup/product.html.
Diffie, et al., "New Directions in Cryptography", IEEE Transactions on Information Theory, Nov. 1976, pp. 644-654, vol. IT-22.
Ledl, et al., "Permutation Polynomials in RSA-Cryptosystems", Advances in Cryptology: Proceeding of Crypto '83, Aug. 1983, pp. 293-301, Santa Barbara, California.
Rivest, et al., "A Method for Obtaining Digital Signatures and Public-Key Cryptosystems", Communications of the ACM, Feb. 1978 pp. 120-126, vol. 27, No. 2.
Schwenk, et al., "Public Key Encryption and Signature Schemes Based on Polynomials over Zn", Advances in Cryptology: Eurocrypt '96 International Conference on the Theory and Application of Cryptographic Techniques, May 1996, pp. 60-71, Springer-Verlag.
Tridgell, et al., "Rsync", Nov. 2006, pp. 1-43, printed on Jun. 26, 2007, available at http://Samba.anu.edu.au/ftp/rsync.html.
Tridgell, et al., "The rsync Algorith", Department of Computer Science, Australian National University, Nov. 1998, pp. 1-10.
International Search Report for International (PCT) Patent Application No. PCT/US07/68281, dated Jul. 3, 2008.
Written Opinion for International (PCT) Patent Application No. PCT/US07/68281, dated Jul. 3, 2008.
International Preliminary Report on Patentability for International (PCT) Patent Application No. PCT/US07/68281, dated Nov. 11, 2008.
Official Action for Australia Patent Application No. 2007247939, dated Apr. 20, 2011 2 pages.
Official Action for Australia Patent Application No. 2012202658, dated Oct. 15, 2013 3 pages.
Notice of Acceptance for Australia Patent Application No. 2012202658, dated Jun. 20, 2014 2 pages.
Official Action for Canada Patent Application No. 2,651,323, dated Apr. 2, 2014 2 pages.
Notice of Allowance for Canada Patent Application No. 2,651,323, dated Jun. 4, 2015 1 page.
Supplementary European Search Report for European Application No. 07761916, dated Jun. 5, 2009.
Examination Report for European Patent Application No. 07761916.1, dated Aug. 12, 2009.
Examination Report for European Patent Application No. 07761916.1, dated Nov. 12, 2013, 4 pages.
Official Action for European Patent Application No. 07761916.1, dated May 20, 2015 6 pages.
Summons to Attend Oral Proceedings for European Patent Application No. 07761916.1, dated Jan. 9, 2017 9 pages.
Official Action for U.S. Patent Application No. 1075/DELNP/2008, dated Dec. 28, 2015 3 pages.
Decision to Grant Patent for India Patent Application No. 10075/DELNP/2008, dated Jun. 30, 2017 3 pages.
Official Action for Japanese Patent Application No. 2009-510109 (English translation), dated May 8, 2012 2 pages.
Official Action (with English translation) for Korean Patent Application No. 10-2008-7029689, dated Jul. 23, 2013 5 pages.
Examination Report for Singapore Patent Application No. 0808173-9, dated Nov. 23, 2009.
Official Action for U.S. Appl. No. 11/744,741, dated May 12, 2009.
Final Official Action for U.S. Appl. No. 11/744,741, dated Nov. 24, 2009.
Official Action for U.S. Appl. No. 11/744,741, dated Aug. 12, 2010 18 pages.
Official Action for U.S. Appl. No. 11/744,741, dated Jan. 21, 2011 20 pages.
Official Action for U.S. Appl. No. 11/744,741, dated Jul. 26, 2011 5 pages.
Notice of Allowance for U.S. Appl. No. 11/744,741, dated Aug. 16, 2011 6 pages.
Official Action for U.S. Appl. No. 13/236,257, dated Apr. 10, 2013 9 pages.
Final Action for U.S. Appl. No. 13/236,257, dated Jan. 3, 2014 12 pages.
Notice of Allowance for U.S. Appl. No. 13/236,257, dated Jan. 20, 2015 9 pages.
Notice of Allowance for U.S. Appl. No. 14/690,077, dated Jan. 19, 2017 11 pages.

\* cited by examiner

GROUP BASED COMPLETE AND INCREMENTAL COMPUTER FILE BACKUP SYSTEM, PROCESS AND APPARATUS

CROSS-REFERENCE TO RELATED APPLICATIONS

The present application is a continuation of U.S. patent application Ser. No. 14/690,077, filed Apr. 17, 2015, which is a continuation of U.S. patent application Ser. No. 13/236,257, filed Sep. 19, 2011, now U.S. Pat. No. 9,037,545, which is a continuation of U.S. patent application Ser. No. 11/744,741, filed May 4, 2007, now U.S. Pat. No. 8,051,043, which claims the benefit of U.S. Provisional Patent Application Ser. No. 60/746,607, filed May 5, 2006, the entire disclosures of which are hereby incorporated herein by reference.

FIELD OF INVENTION

The present invention relates generally to computer data rights and data identity. More specifically, the present invention is applicable to improving data management as it applies to file systems, computer data backup, and computers in general.

BACKGROUND

Modern society relies heavily on computers and computer networks (computer systems) and subsequently the Internet, as it is essentially a large computer system. Managing what person or entity has rights to a particular file is extremely difficult, resource intensive and critical to maintaining the privacy of data. Current implementations of rights management and file identification are so inefficient that large concessions and compromises have been made across the computing field.

Rights management, in accordance with the prior art, is typically done on a per user basis. A user is generally authenticated and is granted rights on an individual or group basis. It is common for files associated with each user to be compared bit for bit or through the use of some algorithm. Common comparison methods include a crc-32 signature, a file size check, and a more robust md5 method that is typically employed for larger files. File comparison is typically done in a manual process on large downloads. A large file would be supplied with an md5 checksum. The user downloads the file and runs an md5 utility on the downloaded file and verifies that the checksums match. Traditionally, separate copies of files are maintained for each user.

One inefficiency introduced when comparisons are performed relates to the process of computer backup. Most backup techniques rely on taking an initial image or full backup of the entire contents of a computer system. Using initial images or full backups may result in very large backups being created during computer backup processes. There are various techniques for reducing the size of backups that exclude parts of the file system and/or do not copy data already backed up. One technique for reducing the size of the backups is to only copy files that do not already exist. This technology utilizes crc-32 as a checksum along with file name designators to determine if a file is already in the repository. Employing the crc-32 technique does not reasonably guarantee the uniqueness of the file as there are many possible combinations of data of the same size that will generate the same crc-32 data. Moreover, using the crc-32 technique has an inherent file rights problem and file identity problem. If duplicate files are not backed up, the backup space is essentially a shared system. With this shared system one must determine which files each backup client has rights to.

Another such inefficiency is in the process of configuration management. Configuration management is the process of managing the configuration of a computer system. This process includes capturing and restoring configuration sets. Configuration sets may contain file structures and configuration information, as well as scripts to update configuration information or manipulate a file system. The inefficiency lies in the inability of the system to guarantee the uniqueness of files. Configuration sets are complete bundles of relevant data. Many configuration sets will have multiple copies of the same files simply because of the complexity of managing files that are not assured to be unique.

The list of inefficiencies with computer storage, management, and data backup systems continues almost indefinitely. For example, a significant amount of inefficiency exists in the process of email storage and other message storage techniques as well as application data storage.

SUMMARY

Accordingly, it is an object of the present invention is to provide a more efficient method and system for managing files, file rights, and file identity.

In accordance with at least one embodiment of the present invention a method for determining a reasonably unique credential is provided. The method generally comprising:

receiving a first inventory of electronic data stored on a first remote storage medium, wherein the first inventory comprises at least one descriptor;

comparing the at least one descriptor of the first inventory to a list of descriptors associated with a second inventory of electronic data stored on a backup data storage medium, wherein the second inventory of electronic data comprises electronic data from a plurality of storage mediums different from the first remote storage medium;

determining that a first descriptor from the at least one descriptor of the first inventory substantially matches a second descriptor from the list of descriptors associated with the second inventory; and reporting to the first remote storage medium that electronic data associated with the first descriptor is already stored in the backup data storage medium.

As used herein, "electronic data" may correspond to electronic files, portions of electronic files, chunks of data, data structures, metadata, or any other piece of electronic data.

A descriptor may be a combination of file metadata (e.g., file storage location and other bibliographic information pertaining to the file) and cryptographic signature or signatures. The use of a descriptor, in one embodiment, allows a multitude of files to be stored without any substantially identical files being stored more than once. This can be made possible without actually providing the file and without comparing the files bit for bit. A database and/or other software application can manage the descriptors in a system that provides higher-level functionality. In one embodiment, a higher-level functionality is used because many files are exact copies of other files and need not be stored if file management issues can be overcome. Reducing the amount of redundantly stored files is important because of the cost and limitations in memory, storage, and network resources.

Another aspect of the present invention is a method and system that is capable of determining a reasonably unique descriptor. The determined descriptor may be a combination of file metadata and cryptographic signature or signatures. The descriptor, in one embodiment, enables a possessor of the descriptor to authenticate that the user associated with the processor and subsequently the processor has the right to the file even if the processor only posses the descriptor and no longer possess the file. In such embodiment, the processor is enabled to determine that it has rights to a particular file because determining the descriptor for a file, without ever possessing the file, is extremely difficult even when relatively weak cryptographic routines are used to generate the descriptor.

A further aspect of the present invention provides for the use of cryptographic routines or algorithms. The cryptographic algorithms are substantially more difficult to break if the entity trying to break the routine ("attacker") does not have access to both the secret and the message. In accordance with at least some embodiments of the present invention, an attacker has access to neither. This makes the authentication of files very secure, as the unauthorized entity would have to guess the file metadata as well as the signature or signatures, a task that is extremely difficult if not completely impractical to accomplish. In fact, when multiple signatures are used to identify a file, one method for generating valid descriptors would be to start with an actual file, in which case all that would be accomplished by the attacker is they would be given access to a file they already have.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

These and other advantages will be apparent from the disclosure of the invention(s) contained herein. The above-described embodiments and configurations are neither complete nor exhaustive. As will be appreciated, other embodiments of the invention are possible utilizing, alone or in combination, one or more of the features set forth above or described in detail below.

DETAILED DESCRIPTION

The invention will be illustrated below in conjunction with an exemplary data storage and backup system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to provide a group-based file backup system.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, any device with permanent storage capabilities, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a backup server, at one or more users' premises, or some combination thereof. Similarly, one or more functional portions of the system could be distributed between a server, gateway, and/or associated communication device.

Figure 1:
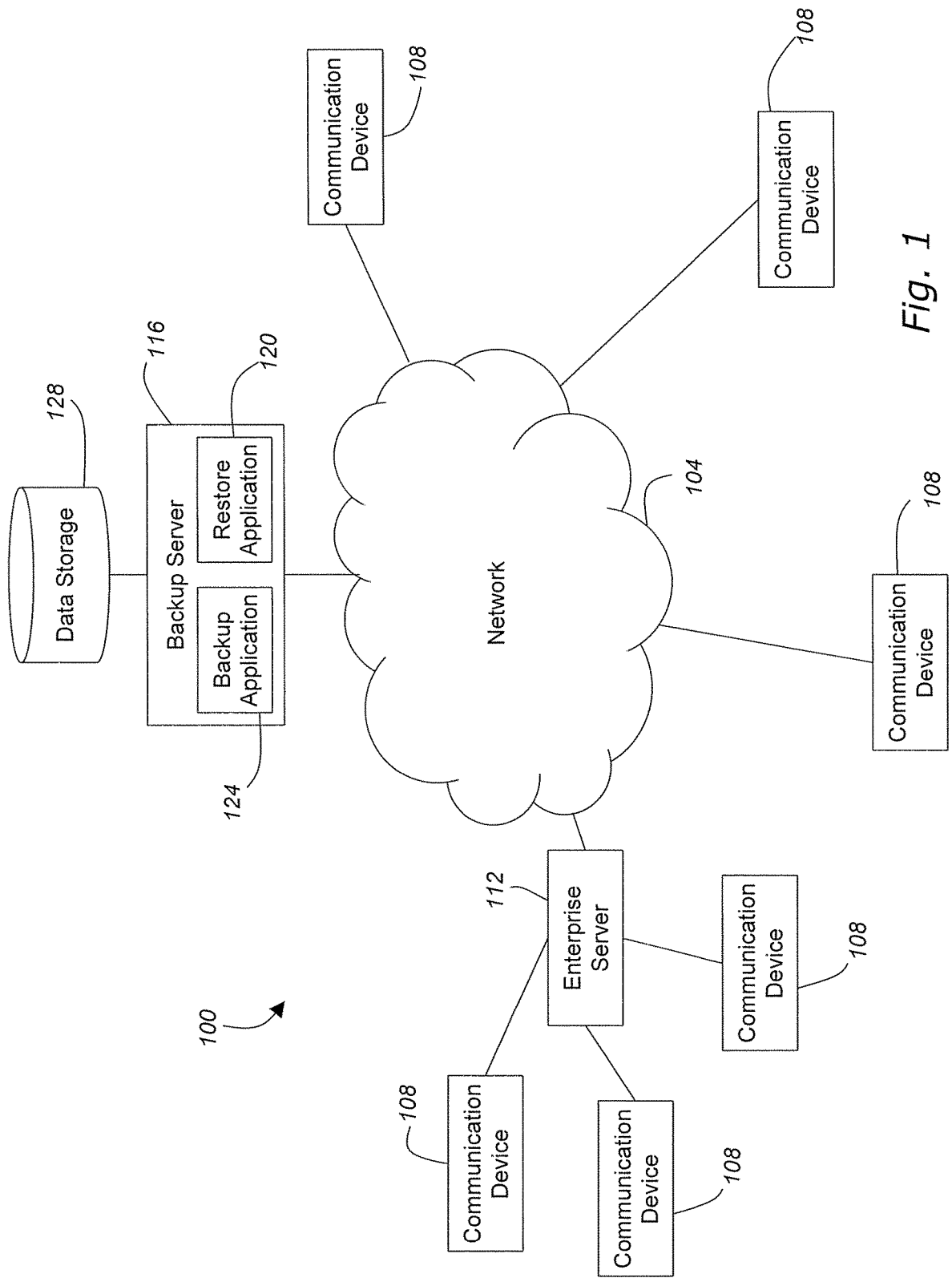
FIG. 1 is a block diagram depicting a communication system in accordance with certain embodiments of the present invention.

Referring initially to FIG. 1, a communication system 100 will be described in accordance with at least some embodiments of the present invention. The communication system 100 generally comprises a communication network 104, one or more communication devices 108, an enterprise server 112, a backup server 116 including a backup application 124 and a restore application 120, and a data storage area 128.

The communication network 104 may comprise any type of information transportation medium and may use any type of protocols to transport messages between endpoints. The communication network 104 may include wired and/or wireless communication technologies. Examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), the Internet, and any other type of packet-switched or circuit-switched network known in the art. In addition, it can be appreciated that the communication network 104 need not be limited to any one network type, and instead may be comprised of a number of different networks and/or network types.

The communication devices 108 may be packet-switched and/or circuit-switched and can include, for example, phones, IP phones, Personal Digital Assistants or PDAs, Personal Computers or PCs, laptops, packet-based H.320 video phones and conferencing units, packet-based voice messaging and response units, packet-based traditional computer telephony adjuncts, conventional wired or wireless telephones, cellular phones, and the like.

The enterprise server 112 may comprise a dedicated processor that functions to provide services to selected client devices (e.g., communication devices 108). The enterprise server 112 generally enables communications between two or more communication devices 108 connected within an enterprise and further provides a point of connection for the enterprise to the communication network 104. The enterprise server 112 may comprise any type of processing medium operable to perform instructions stored on an electronic data storage area. The term "switch" or "server" as used herein should be understood to include a an enterprise server, a device with permanent storage capabilities, or other type of telecommunications system switch or server, as well as other types of processor-based communication control devices such as media servers (i.e., email servers, voicemail servers, web servers, and the like), computers, adjuncts, etc.

The backup server 116 is adapted to provide file backup facilities. The backup server 116 is characterized by the ability to manage a file backup system for a group of users, each of which may be associated with one or more communication devices 108. In accordance with certain embodiments of the present invention, the backup server 116 is provided with a backup application 124 to enable users to backup files from their respective communication devices 108 to either the backup server 116 or to the data storage 128. The backup application 124 may be available to only subscribing users or certain communication devices 108. Alternatively, non-sub scribing users/communication devices 108 may be permitted to utilize the backup application 124 to store one or more versions of data from a communication device 108 onto a remote storage 128 facility. Computer media, such as the media that resides on a communication device 108, has a failure rate that requires copies of the data to reside elsewhere for many usage scenarios. These remote backup copies can be restored to a communication device 108 the event of failure of the original media. This process is called backup and restore, which is supported by the backup application 124 and restore application 120 respectively. The backup application 124 and restore application 120 maintained on the backup server 116 provide a central support for the management of a group-based backup system. The backup and restore process has two primary approaches. One is an image or block based back up of the media residing on a communication device 108. The other is a file-based backup. Variations may exist that combine file based and block based backup approaches. In accordance with some embodiments of the present invention, a full copy of the existing data structure on a communication device 108 can be backed-up via the backup application 124 and subsequently incremental and/or full backups can be performed. Incremental backups for each communication device 108 may copy only the data that has changed on that communication device 108 since the last full or incremental backup. Restoration varies from individual files to complete media restoration.

Backup systems in accordance with embodiments of the present invention typically group backups by volume sets, where a volume set consists of an entire image and incremental backups. Thus, each volume set backup contains an entire image and snapshots of changes. Traditionally, none of this information is shared across multiple volume sets despite the fact that typically most of these files are identical. Identical files represent a majority of the files on each communication device 108. The backup server 116 is characterized by the ability to act as a manager of an indexed storage of electronic data and has the ability to respond to communication devices 108 informing them whether a particular piece of electronic data is already stored. The communication devices 108 can each uniquely identify each file to the backup server 116 assuring only one copy is actually stored even though a number of communication devices 108 have backed up the same file. The backup application 124 combines the backups of all communication devices 108 to dramatically reduce storage and network requirements.

A reason for volume sets is to provide the assurance that a file can only be retrieved by someone having rights to the file. Traditionally, this is assured in the volume set backup by restricting access to the backup repository and various access rights. In accordance with embodiments of the present invention, the restore application 120 restricts access to files by requiring the restorer (i.e., the person or communication device 108 requesting the restore) to provide the filename, size, and unique signature of the file. This information is only known internally to the software and retrievable from a previously generated inventory. Accordingly, the backup application 124 and restore application 120 work cooperatively to maintain a group-based file backup system on the data storage 128 that maintains only one copy of unique files and allows access to such files by a plurality of communication devices 108 if those communication devices 108 can provide the proper information, usually in the form of a descriptor, to the backup server 116. If that information is provided to the backup server 116, then the requesting communication device 108 is allowed to restore or otherwise access the file from the data storage 128. As can be appreciated by one skilled in the art, the enterprise server 112 may also utilize the backup facilities provided by the backup server 116. More specifically, the enterprise server 112 may perform backups of its own data and/or coordinate backups of various communication devices 108 connected to the enterprise server 112.

Applications provided by the backup server 116, in accordance with at least one embodiment of the present invention, are essentially client/server applications but each client can be a server as mentioned earlier. The backup server 116 may maintain the inventories of all the backups and can thus provide the files to communication devices 108 that have or should have a particular file. If the system supported the ability to provide a list or partial list of communication devices; with the particular file and the ability to provide partial file transfer the server the system becomes a distributed file distribution application.

Essentially the backup server 116 provides the capability for a community or group of users to coordinate file storage and share access to files that are common between two or more users within the community or group. Accordingly, the backup server 116 can provide each communication device 108 a remote location for file backup but does not necessarily have to allocate memory for each of the files on each communication device 108. Rather, the backup server 116 can store a single copy of a file and will provide that file to each user in the community or group that can prove they have access to the file based on a supplied descriptor (e.g., identifier of a unique file and credential proving access permissions).

The data storage 128 may correspond to any type of known data storage medium or combination of storage mediums. A data storage 128 may include any media used for persistent storage such as a hard drive or drives, optical storage drives, non-volatile RAM, Storage Area Network, or network attached storage.

It should be emphasized that the configuration of the servers 112, 116, user communication devices 108, and other elements as shown in FIG. 1 is for purposes of illustration only and should not be construed as limiting the invention to any particular arrangement of elements.

It should also be noted that the backup server 116 is not a necessary in accordance with certain embodiments of the present invention. Rather, the data storage 128 may be implemented as a local repository (e.g., local to a communication device 108 or enterprise server 112) and significant efficiencies can still be realized.

Figure 2:
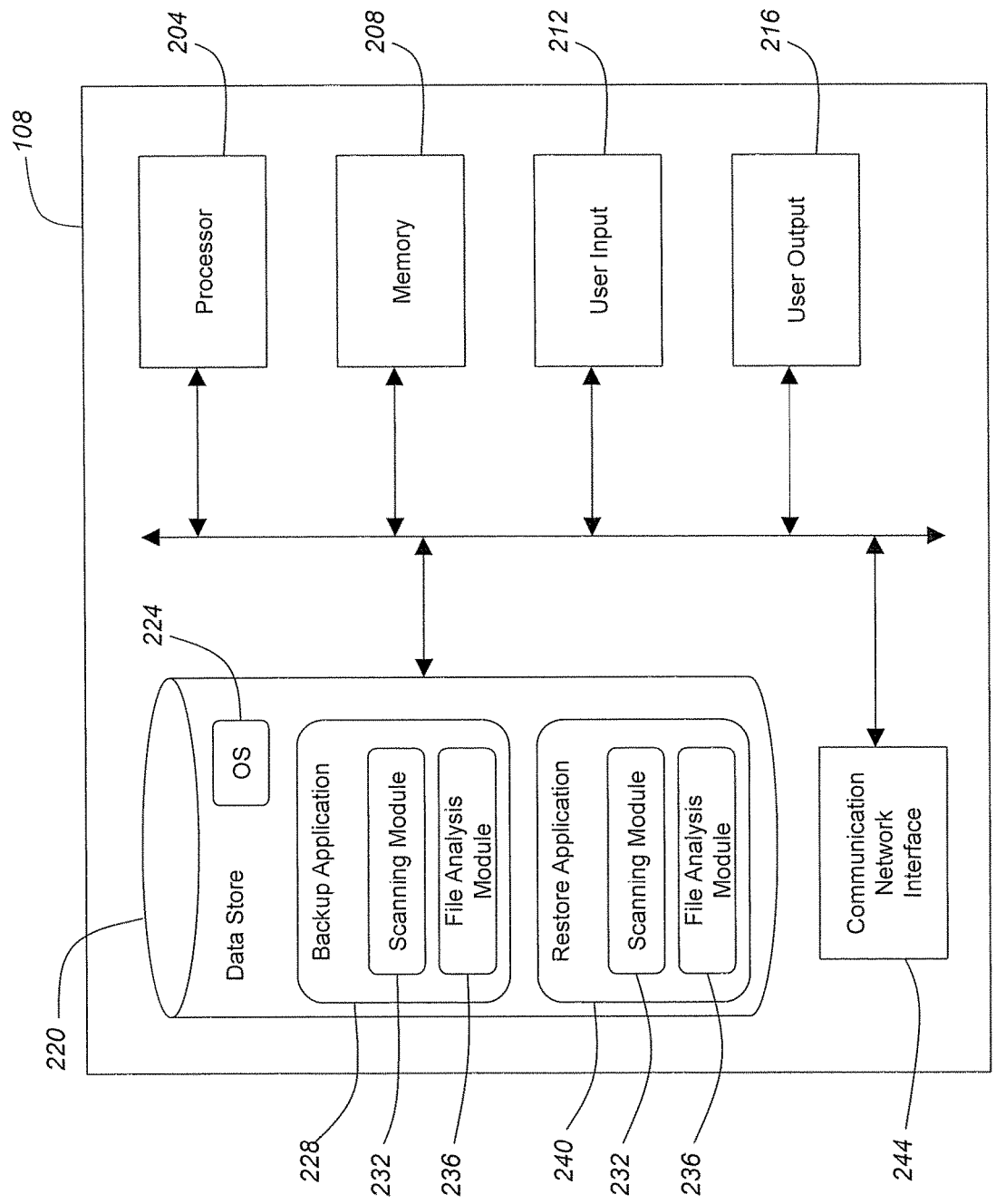
FIG. 2 is a block diagram depicting a communication device in accordance with certain embodiments of the present invention.

With reference now to FIG. 2, components of a communication device 108, such as a communications or computing device, are depicted in block diagram form in accordance with embodiments of the present invention. The components may include a processor 204 capable of executing program instructions. Accordingly, the processor 204 may include any general-purpose programmable processor, digital signal processor (DSP) or controller for executing application programming. Alternatively, the processor 204 may comprise a specially configured application specific integrated circuit (ASIC). The processor 204 generally functions to run programming code implementing various functions performed by the communication device 108.

A communication device 108 may additionally include memory 208 for use in connection with the execution of programming by the processor 204 and for the temporary or long-term storage of data or program instructions. The memory 208 may comprise solid-state memory resident, removable or remote in nature, such as DRAM and SDRAM. Where the processor 204 comprises a controller, the memory 208 may be integral to the processor 204. The memory 208 may be volatile and/or non-volatile memory.

In addition, the communication device 108 may include one or more user inputs 212 and one or more user outputs 216. Examples of user inputs 212 include, without limitation, keyboards, keypads, touch screens, touch pads, and microphones. Examples of user outputs 216 include, but are not limited to, speakers, display screens (including touch screen displays), and indicator lights. Furthermore, it can be appreciated by one of skill in the art that the user input 212 may be combined or operated in conjunction with a user output 216. An example of such an integrated user input 212 and user output 216 is a touch screen display that can both present visual information to a user and receive input selections from a user.

A communication device 108 may also include data storage 220 for the storage of application programming and/or data. In addition, operating system software 224 may be stored in the data storage 220. The data storage 220 may comprise, for example, a magnetic storage device, a solid state storage device, an optical storage device, a logic circuit, or any combination of such devices. It should further be appreciated that the programs and data that may be maintained in the data storage 220 can comprise software, firmware or hardware logic, depending on the particular implementation of the data storage 220.

The data storage 220 may further include a backup application 228 and a restore application 240 that provides functionality similar to the backup server 116 described in relation to FIG. 1. The backup application 228 resident on the communication device 108 may provide the ability to backup various files and other electronic data from the communication device 108 to a remote storage location such as data storage 128. To facilitate coordination of a group-based backup system, the backup application 228 may be provided with a scanning module 232 and file analysis module 236. The scanning module 232 is provided to perform an initial scan of local files to make a quick determination as to whether file data has been changed, updated, added, etc. The backup application 228 may employ the scanning module 232 to scan a selected number of storage drives or other storage media to create a shadow copy of a drive. By scanning a particular drive or similar storage medium, the scanning module 232 is capable of creating a file inventory for the selected drive. The file inventory reflects the current state of the drive and may include a description of the hierarchical structure of the drive. The scanning module 232 may also be implemented as a file system monitor that continuously tracks changes for a continuous real-time backup solution.

While the scanning module 232 is configured to cursorily scan a selected media, the file analysis module 236 is configured to perform a more in-depth analysis of files that the scanning module 232 has identified as possibly changed, updated, added, and so on. The scanning module 232 may be adapted to apply a descriptor algorithm to each file identified as possibly altered. The application of the descriptor algorithm creates a unique descriptor of each file. In accordance with certain embodiments of the present invention, the analysis module 236 is capable of generating a hash comprising a unique alpha-numeric string based on the file data itself. The descriptor algorithm uses, as an input, the file data including raw data and possibly metadata to create the descriptor that uniquely (i.e., substantially uniquely) identifies the file or a portion of the file. The results of the application of the descriptor algorithm (e.g., the generated hash corresponding to each file or portion of a file) may also be added to the inventory to help describe the current state of the drive.

The backup application 228 may then transmit the updated inventory of the descriptors or just changes to the inventory of the descriptors to the backup server 116, where the backup server 116 can compare the inventory to files already stored in the data storage 128 to determine what files will need to be transmitted from the communication device 108 to the backup server 116 to complete a backup of such files.

The restore application 240 may be provided to facilitate the transfer of files from a backup server 116 to the communication device 108. More particularly, the restore application 240 may utilize a scanning module 232 and a file analysis module 236 similar to those provided for the backup application 228 to determine what files need to be transferred from the backup server 116 to the communication device 108 during a restore operation. Rather than using the descriptors of files to determine if a file needs to be downloaded to the backup server 116, the restore application 240 utilizes the descriptors to request access to the files already stored in data storage 128. The restore application 240 may utilize the scanning module 232 to determine if any files currently stored in local memory (i.e., the memory of the communication device 108) have changed since the point-in-time corresponding to the requested restore. The scanning module 232 may check metadata of files and compare the create time and edit time of the file with the point-in-time corresponding to the requested restore. If the files were marked as altered some time after the identified point-in-time, then the restore application 240 may employ the file analysis module 236 to determine if the alterations affected any content of the file. The file analysis module 236 may apply a descriptor generating algorithm to each of the identified files and compare that with a historical inventory of descriptors from the identified point-in-time. Any files or portion of a file having a different descriptor may then be identified by the restore application 240 as requiring replacement during the restore operation. Otherwise, if the file or portion of a file has not changed, then the restore application 240 may determine that the file or portion of file does not need to be transmitted from the backup server to the communication device 108 during the restore operation.

Although the backup application 228 and restore application 240 are depicted as having a dedicated scanning module 232 and file analysis module 236, one skilled in the art will appreciate that a single scanning module 232 and file analysis module 236 may be provided in the data store 220 and shared by the backup application 228 and restore application 240.

The data storage 220 may also contain application programming and data used in connection with the performance of other functions of the communication device 108. For example, in connection with a communication device 108 such as a telephone or IP telephone, the data storage 220 may include communication application software. As another example, a communication device 108 such as a Personal Digital Assistant (PDA) or a general-purpose computer may include a word processing application in the data storage 220. Also, a communication device 108 such as a portable music/video storage and playback device may include applications related to the playback of various stored content.

A communication device 108 may also include one or more communication network interfaces 244. Examples of communication network interfaces 244 include, but are not limited to, a network interface card, a modem, a wired telephony port, a serial or parallel data port, radio frequency broadcast transceiver, a USB port, or other wired or wireless communication network interfaces.

Figure 3:
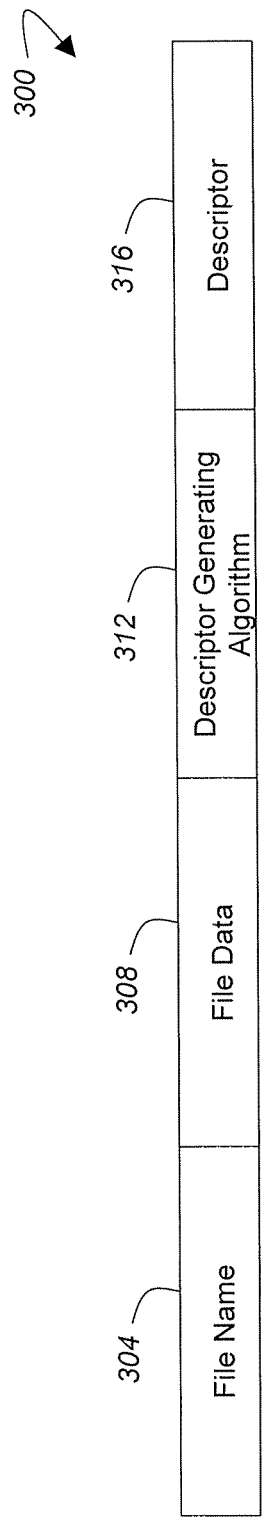
FIG. 3 is a logical representation of a data structure employed in accordance with certain embodiments of the present invention.

With reference now to FIG. 3, a data structure 300 used to manage files and data structures in a backup/restore operation will be described in accordance with at least some embodiments of the present invention. The data structure 300 may comprise a file name (or data structure name) field 304, a file data field 308, a descriptor generating algorithm filed 312 and a descriptor field 316. The data structure 300 may be maintained, completely or in part, at a communication device 108, an enterprise server 112, the backup server 116, or in data storage 128. The file name field 304 may be used to store the electronic file name or data structure identifier. The file name field 304 may store the name provided to the electronic file upon creation of the file along with any other identification information such as location in memory and the like.

The file data field 308 may be utilized to store or represent file data. Non-limiting examples of file data that may be represented in the file data field 308 include actual file data, file metadata such as descriptive metadata (e.g., metadata that describes a resource for purposes such as discovery and identification including elements like title, abstract, author, and keywords), structural metadata (e.g., metadata that indicates how compound objects are put together, for example, how pages are ordered to form chapters), and administrative metadata (e.g., metadata that provides information to help manage a resource, such as when and how it was created (creating and modification timestamps), file type and other technical information, and who can access it).

The descriptor generating algorithm field 312 may comprise data related to a descriptor generating algorithm that is used to generate descriptors for various files. In accordance with at least some embodiments of the present invention, the descriptor generating algorithm is an algorithm applied uniformly to all files. Communication devices 108, enterprise servers 112, and backup servers 116 alike should apply the descriptor generating algorithm uniformly such that a common file has the same descriptor associated with it, regardless of which endpoint generated the descriptor. This uniform representation of electronic files by descriptors allows the backup server 116 to know with a reasonable amount of certainty when a particular file is already stored in the data storage 128. The descriptor may also serve as a credential for the communication devices 108 that wish to access the single copy of a stored file. If the descriptor is generated properly at each endpoint a uniform identification system is created that will afford efficient group-based backup storage of electronic data. Examples of a descriptor generating algorithm that may be utilized include, without limitation, an MD5 hash, SHA256, ssh256, crc-32, and any other hash generating algorithm known in the art. The descriptor generating algorithm may be either a cryptographic or non-cryptographic algorithm depending upon the desired level of security. Additional data may be provided in the descriptor generating algorithm filed 312 outlining the various inputs that may be included in the preparation of the descriptor. For example, a descriptor may be generated based simply upon the actual file data. Portions of metadata may also be included as inputs to the descriptor generating algorithm.

Figure 4:
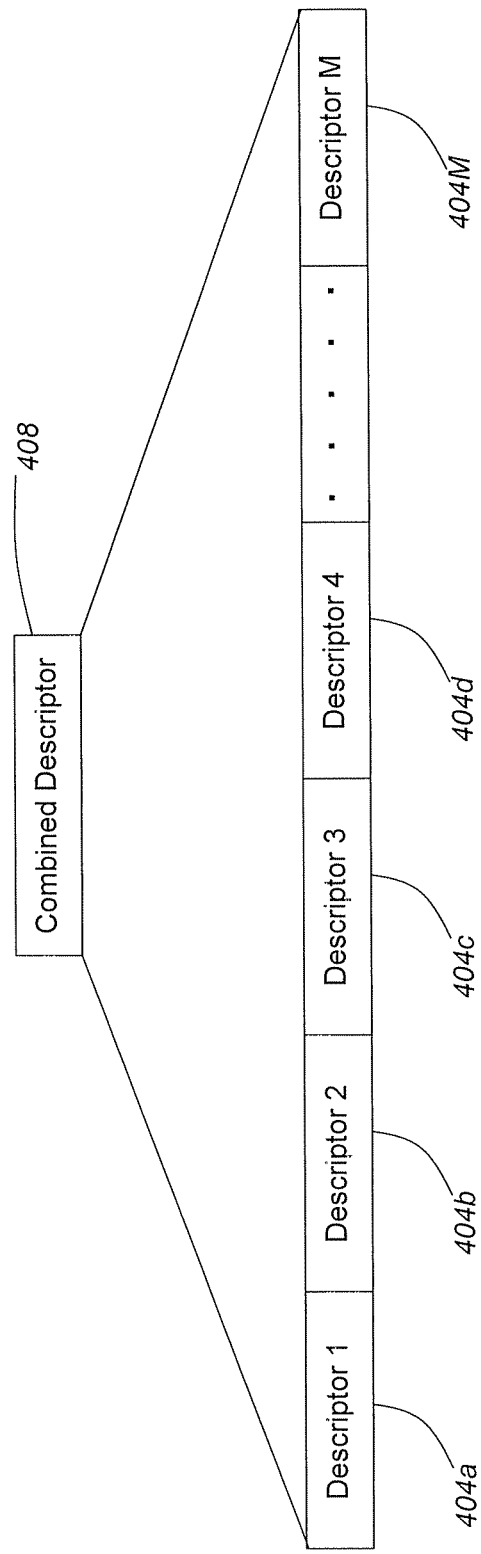
FIG. 4 is an example of a descriptor utilized in accordance with certain embodiments of the present invention.

The generated descriptor may then be stored in the descriptor field 316. As noted above, each electronic file or portion of a file may have a descriptor associated therewith. The descriptor is generally used as the common short-hand representative of the electronic file throughout the group-based backup system. Accordingly, a communication device 108 and backup server 116 can reference a common file by independently generating a descriptor for the file using an agreed upon descriptor generating algorithm. As can be seen in FIG. 4, the descriptor for a particular file may be a combination of a number of descriptors such as descriptors 404a-M where M is generally greater than or equal to one. Each descriptor 404 may be used to represent a different portion of data for a common file and each descriptor may represent a predetermined length of data. For instance, if a file is one that is not updated frequently, as determined by its metadata, then the file may be divided into 10 MB chunks and each chunk may have a unique descriptor associated therewith. Alternatively, a file that is updated frequently may be divided into 1 MB chunks to provide a more granular set of descriptors.

The chunk descriptors may then be combined, usually in an additive fashion, to create a combined descriptor 408 that represents the entire file. The use of chunk descriptors is useful in situations where only a portion of a file has changed since it was last backed up. During analysis by the file analysis module 236, the changed chunks may be identified by their new descriptors. Those changed chunks may be the only data that the backup server 116 needs to perform a complete backup of the entire file. More specifically, a communication device 108 may only need to transmit those portions of a file that have changed instead of sending the entire file which will reduce the amount of time required to complete the backup operation.

Separate inventories of descriptors may be maintained on a communication device 108, enterprise server 112, and/or backup server 116. This affords the ability to maintain separate backup inventories and permissions for various communication devices 108 to the common data storage 128 and common files stored therein.

Figure 5:
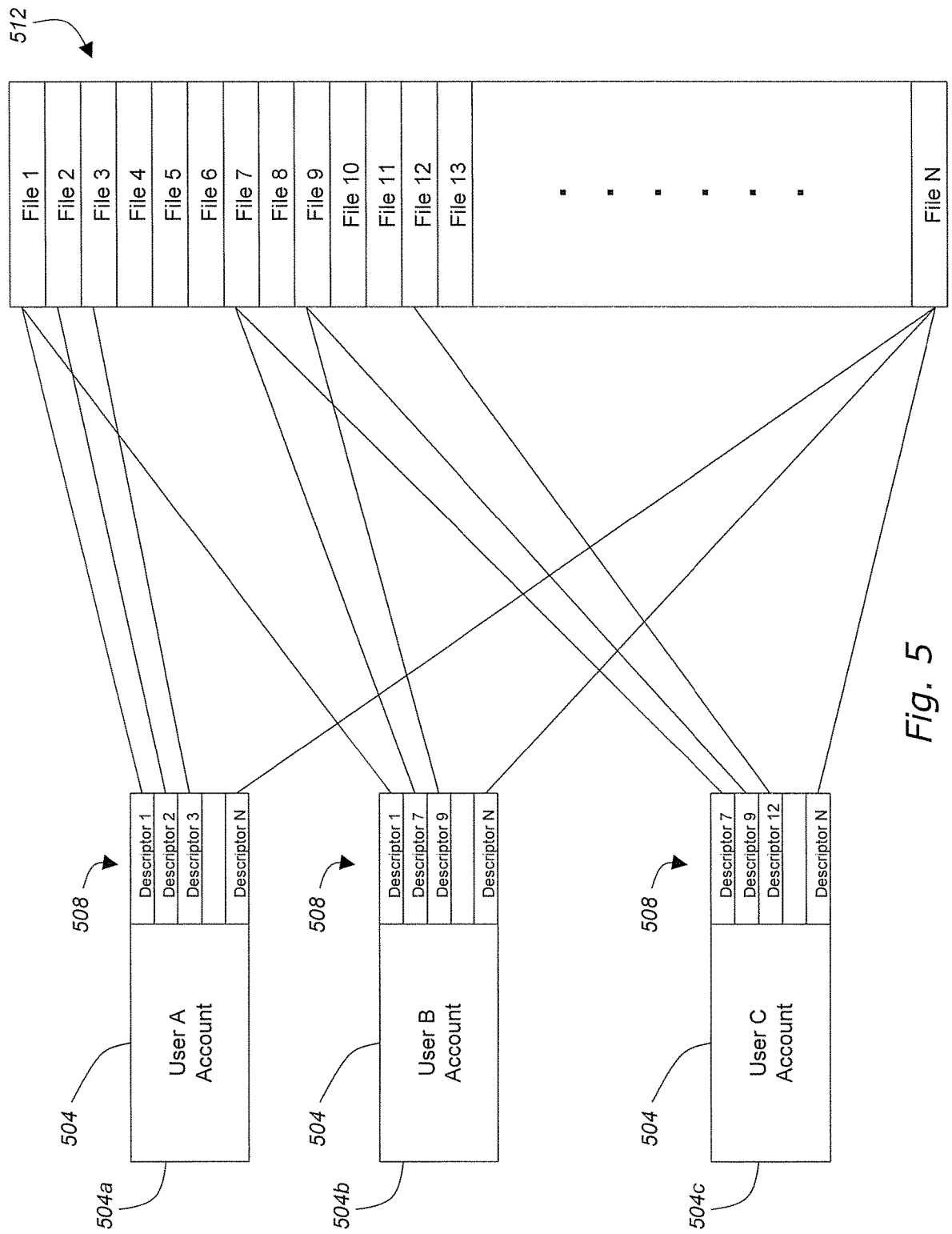
FIG. 5 is a group-based backup data structure employed in accordance with certain embodiments of the present invention.

Referring now to FIG. 5, a group-based backup data structure will be described in accordance with at least some embodiments of the present invention. The backup data structure is typically maintained on the backup server 116 as a reference to the identity of files and when those files were backed up on a per-user basis. More specifically, the backup server 116 may be designed to maintain inventories 504 for each user account. A first inventory 504a may correspond to user A, a second inventory 504b may correspond to user B, and a third inventory 504c may correspond to user C. The inventory 504 may be associated with a single communication device 108 of a particular user. Alternatively, an inventory 504 may be maintained for a user that identifies files from different communication devices 108 associated with the same user. This way, when one communication device 108 fails, a user may utilize his/her entire inventory to restore files from all of his/her communication devices 108 back to the previously failed communication device 108. Included in a user's inventory may be a list of descriptors 508. The list of descriptors 508 for each user are a shorthand representation of the actual files, or portions of files, that have been recently backed up for the user's communication device 108.

The backup server 116 may additionally maintain list of backed up files 512 currently stored in the common data storage 128. The backup server 116 may reference the list of backed up files 512 through a descriptor mapping. In other words, the file data itself may be maintained on the data storage 128 and the backup server 116 may maintain its list of backed up files 512 as a list of descriptors. Accordingly, the backup server 116 can quickly compare the descriptors associated with each user to the descriptors outlined in the list of backed up files 512 to determined which files each user has access to. Accordingly, the backup server 116 only has to maintain one copy of any file in the data storage 128 and can utilize a descriptor mapping to determine which user and/or communication device 108 is allowed access to the one copy of a file. This is particularly useful in situations where a single file is stored on a number of different communication devices 108. Each communication device 108 may utilize the file locally but desires a backup of the file on the data storage 128. The backup server 116 can provide the backup facilities for the file but does not have to maintain a separate copy corresponding to each copy in the communication system 100. For instance, user A has a file corresponding to descriptor 1 on his/her communication device 108. User B may also have the same file corresponding to descriptor 1. The file corresponding to descriptor 1 may be a commonly utilized word processing application, such as Microsoft Word®, that has little to no differences between users. The file corresponding to descriptor 2, on the other hand, may be a file unique to user A (e.g., macros or preferences for the word processing application) and are accordingly also backed up. User A will be the only user able to access those preferences, unless another user has the exact same preferences, because user A is the only one with the data that results in descriptor 2.

As a further example, the file corresponding to descriptor N may comprise base application such as an operating system that is common to all users, or at least a large proportion of them. Rather than maintaining a separate copy of the same file multiple times, each user with the file and the corresponding ability to generate descriptor N will be able to access the file from backup if such access is required during a restore operation.

Although only three user accounts are depicted, one skilled in the art will appreciate that the backup server 116 may support any number of user backup accounts. Advantageously, as the number of users utilizing the backup accounts increases the overall efficiency of the system increases since the probability of having duplicate files on two or more communication devices 108 increases. Furthermore, efficient backups of the data and subsequent restores are facilitated automatically by the use of descriptors. This obviates the need for a user to identify which files he/she wants to send across the network 104 during backup in an attempt to increase backup efficiency. Rather, the backup server 116 automatically identifies the duplicate files, or portions of files, and then requests non-duplicate files or portions of files to be transmitted from the communication device 108 to the backup server 116 for storage.

Figure 6:
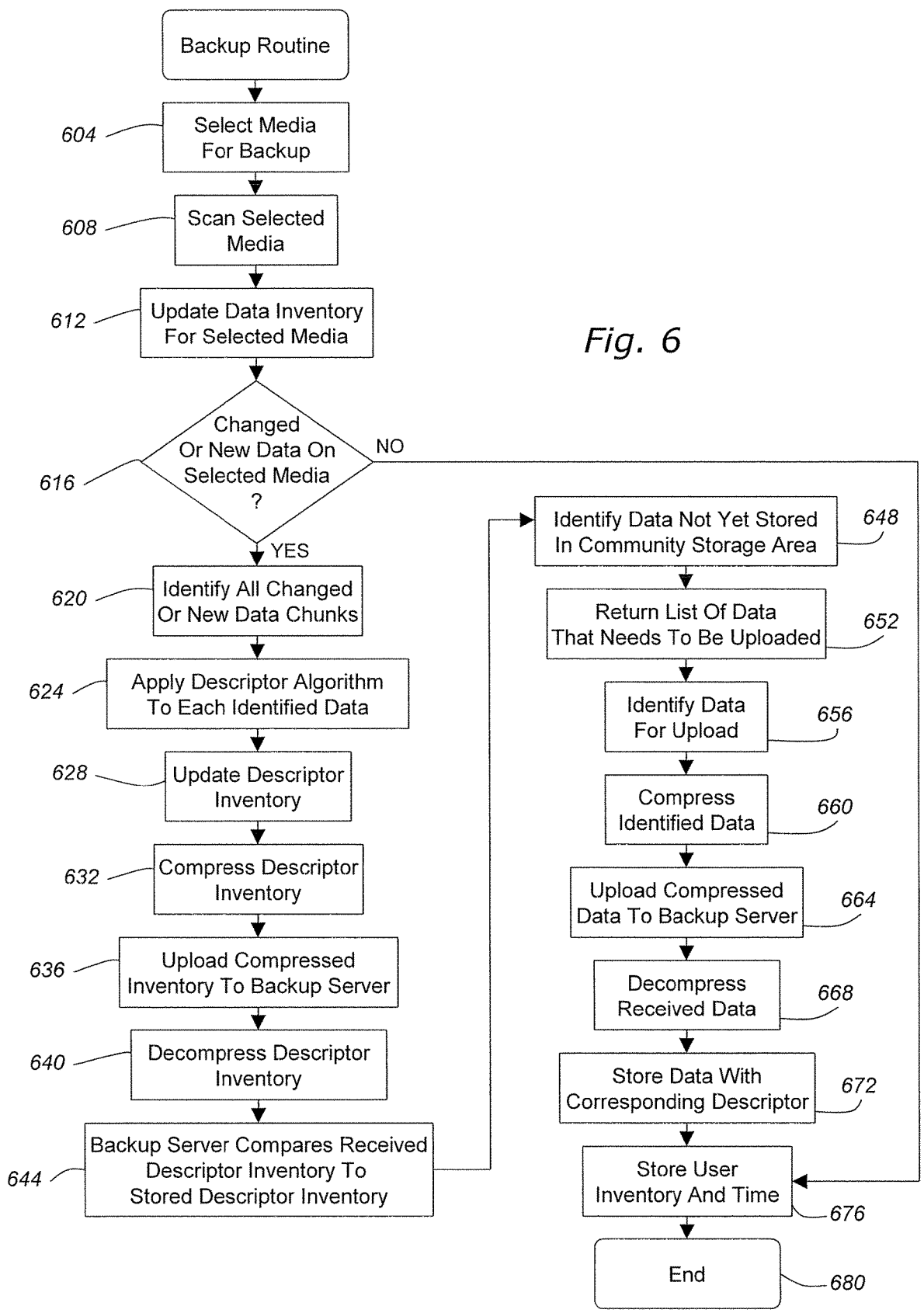
FIG. 6 is a flow chart depicting aspects of a backup routine in accordance with certain embodiments of the present invention.

With reference to FIG. 6, a backup routine will be described in accordance with at least some embodiments of the present invention. Although the following description is mostly in relation to full files and descriptors corresponding to full files, one skilled in the art will appreciate that similar methods may be applied to portions of files, data chunks, data structures, and corresponding descriptors. The routine begins when a media or number of media are selected for backup at a communication device 108 or enterprise server 112 (step 604). A typical selection for a media might be a C: drive of a communication device 108 or a network drive. The user may also select exclusions from the media, which are sets of files that are not to be backed up. The exclusions may be definable based on common criteria. Examples of exclusions that may be defined by a user include temporary or cache files residing on the selected media. Of course, the user is not required to select any exclusions.

After selecting one or more media for backup, the method continues with the scanning module 232 on the communication device 108 scanning the selected media (step 608). In this step the scanning module 232 may create a shadow copy of the drive that provides the ability to read a crash consistent version of the drive as it existed at the point the shadow copy was created. More specifically, the scanning module 232 may create a snapshot that, at a minimum, identifies the electronic data (e.g., files) resident on the selected media and the time at which those files resided there. The metadata of the various files in the selected media may be scanned to determine if any files have a changed timestamp that is more recent than the last backup.

Thereafter, the scanning module 232 may update the file inventory for the selected media (step 612). The scanning module 232 may recursively examine the selected media comparing it to what is in the last inventory. If there was no previous backup for the selected media, then all electronic data on the selected media are considered new to the backup. Alternatively, if there was a previous backup, then the scanning module 232 may attempt to identify only the electronic data that has changed or been added since the last backup. In step 616, the scanning module 232 determines if there is any data on the selected media that have been changed or added. If any changes or additions were identified, then the scanning module 232 continues by identifying the changed or new electronic data (step 620). The changed or new electronic data may be identified by file name or by memory location. Electronic data that has been deleted from the media may also be considered changed. As a part of identifying the changes, the scanning module 232 may update its inventory of files based on file name.

Following the identification of changes to the various files and other electronic data on the media, the backup application 228 employs the file analysis module 236 to apply the predetermined descriptor generating algorithm to each identified piece of data (step 624). In other words, the file analysis module 236 applies the descriptor generating algorithm to any file, portion of file, chunk of data, or data structure that has been identified as changed or new to create a new descriptor corresponding to that piece of data.

Once the descriptor generating algorithm has been properly applied to each identified piece of data, the file analysis module 236 continues by updating the descriptor inventory locally (step 628). The updated descriptor inventory may include the new descriptors for the data that has changed or been added as well as voids for files that have been deleted or otherwise removed from the selected media. In addition to results of the application of the descriptor generating algorithm, markers identifying sizes of chunks of files and corresponding descriptors may be included in the updated descriptor inventory. With the descriptor inventory updated, the backup application 228 compresses the descriptor inventory (step 632). Any known type of file compression algorithm may be employed in this step. The compression of the descriptor inventory helps reduce the amount of bandwidth, and subsequent upload time, required to transmit the descriptor inventory across the communication network 104.

The compressed descriptor inventory is then transmitted across the communication network 104 and uploaded to the backup server 116 (step 636). Subsequently, the descriptor inventory is decompressed by the backup server 116 and stored as a part of the user's inventory 504 in the list of descriptors 508. In addition to updating the list of descriptors 508, the backup server 116 may also record the time at which the backup occurred for facilitation of future restore operations.

The backup server 116 may then utilize its backup application 124 to compare the received descriptor inventory to descriptors in the list of backed up files 512 (step 644). In this comparison step, the backup application 124 then determines for each descriptor in the received descriptor inventory, whether the corresponding file, file portion, chunk of data, or data structure is already stored in the data storage 128. Based on the comparison step, the backup application 124 identifies electronic data portions that are not yet stored in the data storage 128 (step 648). The backup application 124 then generates a list of data portions (e.g., a list of files) that need to be uploaded because they are not currently on the data storage 128. The list of data portions, usually in the form of descriptors, is then sent back to the communication device 108 (step 652).

The communication device 108 receives the list of descriptors and identifies the corresponding files, portions of files, chunks of data, or data structures that need to be uploaded to the backup server 116 to complete the backup operation (step 656). The communication device 108 then employs the backup application 228 to compress the identified electronic data (step 660). As previously noted, the compression algorithm utilized during this step may correspond to any compression algorithm known in the art. Furthermore, the compression may be skipped, but does help reduce the file transmission size.

The compressed electronic data, along with their corresponding descriptors, are then uploaded to the backup server 116 (step 664). The step of comparing descriptors does require additional processing as opposed to simply uploading all of the files from the communication device 108 to the backup server 116. However, by performing this preliminary check of descriptors the amount of data transmitted may be greatly reduced if the backup server 116 has copies of most of the files. Since file data, especially for larger applications, can often have a significant size, any reductions in the amount of data that is required for transmission can greatly increase the speed of a backup operation.

Upon receiving the electronic data from the communication device 108, the backup server 116 may optionally decompress the data by employing the reverse of the compression algorithm (step 668). Alternatively, the electronic data may be maintained in its compressed format for storage such that required storage capacity is reduced. The backup server 116 then stores the electronic data in the data storage 128 along with their corresponding descriptor in the descriptors in the list of backed up files 512 (step 672). Thereafter, the backup server 116 stores the user's descriptor inventory (i.e., all of the descriptors corresponding to all files on the communication device 108) along with the time of backup completion (step 676). Following storage of the user's descriptor inventory, the method ends (step 680).

Referring back to step 616, if the backup application 228 determines that there have been no changes to the selected media (e.g., either by altering, adding, or deleting a file), then the method skips to step 676 where the user descriptor inventory is maintained as the same and stored along with the new backup time.

Figure 7:
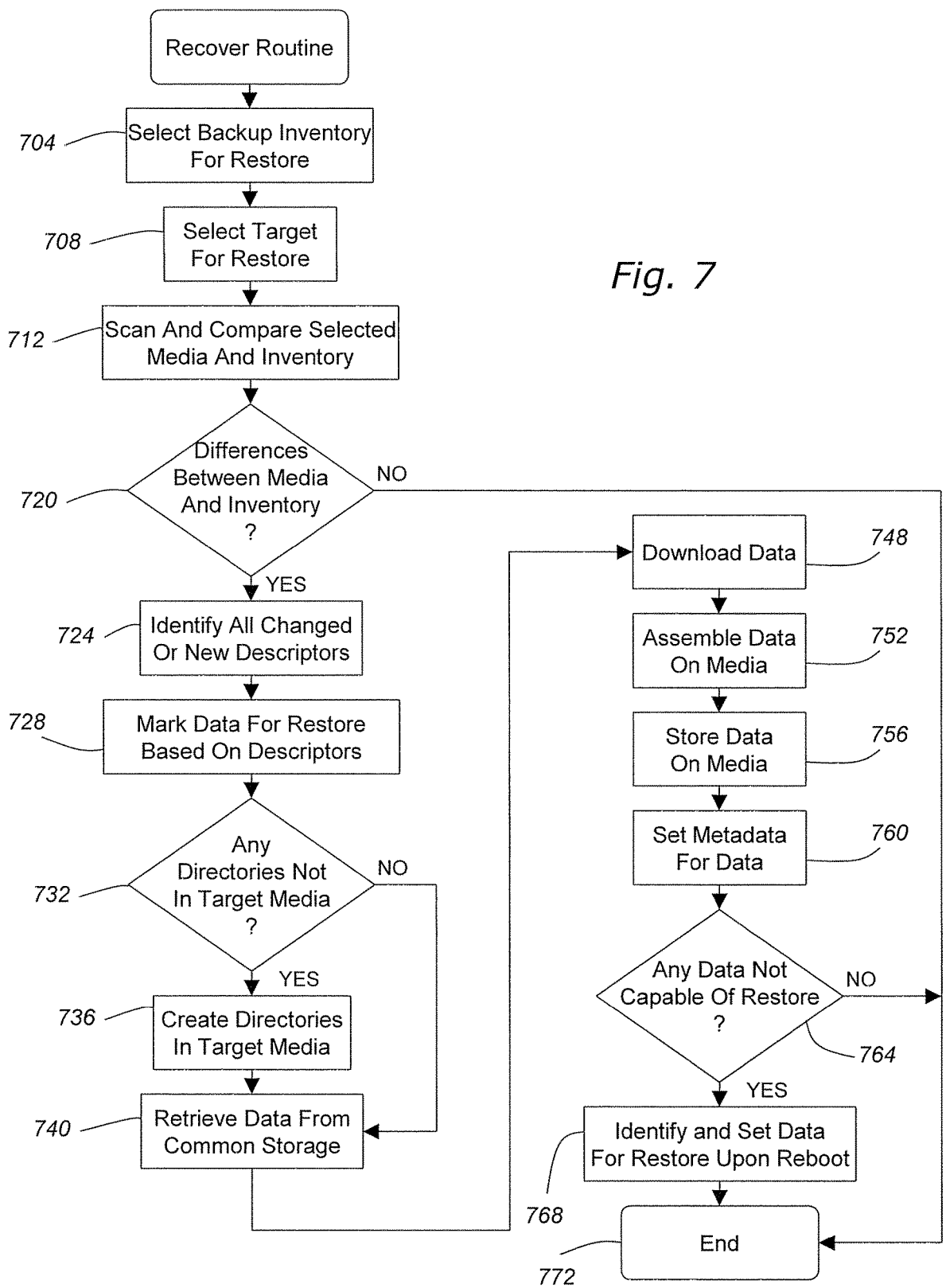
FIG. 7 is a flow chart depicting aspects of a restore routine in accordance with certain embodiments of the present invention.

With reference now to FIG. 7, a restore/recover routine will be described in accordance with at least some embodiments of the present invention. Although the following description is mostly in relation to full files and descriptors corresponding to full files, one skilled in the art will appreciate that similar methods may be applied to portions of files, data chunks, data structures, and corresponding descriptors. The recover routine begins with the selection of a backup inventory for the restore (step 704). In this step, a user essentially selects the point-in-time that they would like to have their communication device 108 restored back to. This may be automatically selected if there is only one backup for a particular communication device 108. Otherwise, if there are multiple backups, the user can select one of the backups that correspond to the desired point-in-time. If the inventory or list of inventories does not exist at the user's communication device, then it may be retrieved from the backup server 116.

Thereafter, the user can select the target media(s) for the restore (step 708). A typical selection would be to restore a C: drive of a communication device 108 or a particular network drive associated with the enterprise server 112.

After the target media has been selected, the restore application 240 of the communication device 108 scans the selected target media and compares the selected media with the inventory (step 712). In the scanning step, the restore application 240 may employ the scanning module 232 to check the metadata of the various files stored on the media to determine if the files or other electronic data have an updated timestamp that is more recent that the selected point-in-time. If the updated timestamp is older than the selected point-in-time, then there may be no need to restore that particular file or electronic data since it already resides on the communication device 108 in the form that it did during the backup step. However, if the scanning module 232 determines that some changes, additions, or deletions of a file or electronic data have occurred since the identified point-in-time, the restore application 240 compares the last media inventory to the selected media itself. Based on the comparison step, the restore application 240 determines if there are any differences between the media and the inventory (step 720). The changes that might occur to a media since the last inventory took place may include changing, adding, or deleting files, portions of files, chunks of data, or data structures from the media.

If any differences are detected, the method continues by identifying the changed electronic data and its corresponding descriptor from the inventory (step 724). More specifically, after the scanning and comparison step, electronic data that is identified as potentially different due to timestamp differences are analyzed to generate the descriptors. If the descriptor is different from the previous descriptor, then the former descriptor is added to the list of files to restore. This can eliminate the need to restore large amounts of data in certain scenarios. For instance, during a restore of a particular backup of a communication device 108 over another communication device 108 such a feature may be useful. However, most electronic data does not usually change since its previous backup and such data would be identified as unchanged if not by the scanning step, then by the comparison of the descriptors. The descriptors from the inventory represent the electronic data at the time the last backup occurred. Those files or electronic data that have changed since the identified point-in-time are then marked for restoration (step 728). More specifically, in accordance with certain embodiments of the present invention, the descriptors corresponding to the electronic data are marked for restoration.

Once the descriptors have been marked for restoration, the restore application 240 continues by determining if any directories in the inventory are not present in the target media (step 732). If there are any directories in the inventory and not in the media, the restore application 240 creates those directories in the target media (step 736). The information required to create such directories may be provided from the structure of the inventory. Depending upon the configuration of the present invention and data in the inventory, existing directories and files are left alone, if possible, renamed, or deleted to reflect the structure defined by the inventory. After creation of the requisite directories, or in the event such a creation was not necessary, the restore application 240 requests that the backup server retrieve the electronic data (step 740). In this step, the restore application 240 may first look in the most recent backups on the communication device 108 itself or some other local media. If the same or reasonably similar descriptors exist indicating that an identical file exists locally on the local communication device 108, the electronic data will be copied from the local copy instead of from the backup server 116. This optimization is extremely effective in the case where a separate machine is being used to restore the backup to a drive that will subsequently be installed into another machine. This eliminates having to download the operating system, for example, assuming the operating systems are the same or similar. If the electronic data is not available locally, then the restore application 240 provides the list of descriptors that have been marked for restore back to the backup server 116. The backup server 116 utilizes the descriptor to file mapping to retrieve the requested electronic data from the data storage 128. The backup server 116 is capable of allowing the communication device 108 to access only those files and other electronic data listed in the inventory associated with the communication device 108. The files that the communication device 108 never had, and therefore cannot generate the corresponding descriptor, will be maintained securely in the data storage 128. Accordingly, the descriptor in this step acts as a credential to the files or electronic data that were previously backed up from the communication device 108.

After the backup server 116 has retrieved the identified electronic data, the backup server 116 downloads the electronic data to the requesting communication device 108 (step 748). The received data is subsequently received and decompressed by the communication device 108 which then assembled on the target media (step 752). Then the restore application 240 stores the all of the electronic data on the target media (step 756). In this step, the file is moved, if possible, into its original location and all metadata is finalized including timestamps, attributes, Access Control Lists (ACLs), and so on. In addition to assembling the electronic data and storing it on the target media, the restore application 240 sets the metadata for the electronic data (step 760). The directories in the inventory which were not on the target media (i.e., were added to the target media in step 736) may also have their metadata restored by the restore application 240. Files and directories that currently exist on the target media and are not in the inventory may be optionally renamed, deleted, touched, or left alone depending upon user preferences.

Following the reassembly and restoration of the target media the restore application 240 determines if there are any files or other electronic data not currently capable of a restore (step 764). Such a situation typically arises if a file is currently open or in use by another application. If such a situation exists, the restore application 240 will identify and set such files and electronic data for a restore upon reboot and the corresponding files and electronic data received from the backup server 116 will be maintained in a temporary data storage area until the system reboots (step 768). After the files and electronic data not currently capable of a restore have been set for restore upon reboot, or if there are no such files, the method ends (step 772).

As an additional embodiment of the present invention, an inventory of the protected media can be generated. This inventory is a list of all files with corresponding descriptors. The file descriptor may contain file information such as file length, ACLs or file rights, full path and file name, file signature, create timestamp, modify timestamp, and last accessed timestamp. The file descriptor may actually consist of multiple file descriptors using multiple cryptography type algorithms such as md5 ssh256 and the file length. The descriptor will reasonably assure the uniqueness of the file. Thus no two different files of the same length and usable data could have the same signature with a reasonable amount of assurance as long as those files have some small difference. The inventory is stored both locally and on the server.

In accordance with an alternative embodiment of the present invention, when a new inventory is generated, the generation can be a full generation where the entire backup configuration is walked as in the inventory generation. This generation could be generated through iterating through the list of all files and only generating new signatures where the modify timestamp has changed. This generation could be generated through a log kept by the application of all file writes to the protected media if the operating system provides such an API. This new inventory can be compared to the last full inventory and all subsequent incremental inventories. This will provide a subset of all protected files that have changed. This inventory can then compared to the master inventory on the backup server 116. If the signature (i.e., descriptor) exists the file is not backed up. If the descriptor does not exist on server the file is compressed and backed up on the server.

Some modern Operating Systems provide an API for notifying an application of file system changes. If the operating system provides such an API the communication device 108 can provide the capability of performing real time incremental backup. When the operating system notifies the communication device 108 that a protected file is being written to and subsequently closes the file the client will analyze the file and check the master inventory on the backup server 116 if the descriptor exists the file is not backed up. If the descriptor does not exist on server the file is compressed and backed up on the server. Then a real time incremental log will be appended with the new analysis.

The user may select a file to restore from a previous inventory. The system then checks to see if the file exists if the file does not exist the file is retrieved from the server by the client providing the descriptor of the file. If the file exists the descriptor is checked. If the descriptor does not match the file is retrieved from the server by the providing the descriptor of the file. If the descriptor matches the version the file is retrieved from the server by providing the descriptor and restored. The files are then compared bit for bit and if they do not match both uploaded to an error tracking area for further analysis.

Full or multiple file restoration walks through the selected inventory or subset restoring each file as in the individual restoration.

Certain files may be particularly difficult to backup. These files are typically special operating system files or database data files. The operating system files such as swap files, registries, and logs are difficult to backup because they are usually large or have a high degree of volatility or both. The database files are difficult to backup for the same reason as operating system files and the volatility issue typically spans multiple files. These issues are addressed by various Operating System and Database API's. These API's can usually be scripted at the OS level copying the consistent data to a protected directory. The actual files would then be excluded. Ideally these API's would be used to assure consistency. Alternatively the system will employ several techniques to get consistent images of individual files and groups of files. In the event that the file is modified in the process of backing up the file or file set. One technique would be to locally copy the file and double verify the descriptor. This technique ensures the file has not changed and is consistent. Another technique is to copy the file or groups of files and logically separating each file into blocks each block will be verified with a descriptor. If the copy block does not match the source block the block is recopied and the descriptor verification begins starts over. Once all of the descriptors match the copy is consistent. If a consistent copy can not be attained because of file volatility the backup of the file or file set is aborted. This technique will work well for log files and low volatility databases. Another technique employs file system monitoring, which like the previous technique is to copy the file or groups of files and logically separating each file into blocks each block will be verified with a descriptor. Instead of recopying the block all writes will be intercepted and executed on the copied blocks until the point in time immediately after the copy completed. This will assure that the copy is consistent.

The backup community, in accordance with at least one embodiment of the present invention, can flag files as belonging to a particular application. This would be at the snapshot level and the file level. The name and other information such as security risk level. The community users could retroactively set these settings individually and a group consensus would be available as well as individual comments. This will enable the community to judge the validity of the files and quickly ascertain what a file is based on community feedback. Thus malware and spyware can be identified as well as the proper files to attain a particular OS revision. Rolling back upgrades that were previously impossible or unsupported by the vendor would be possible.

Since backup sets can be shared this system can become a P2P application. If individual signatures are shared and posted in a searchable form any file could be shared and accessible to anyone that can search.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

Additionally, the systems, methods and protocols of this invention can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and data storage arts.

What is claimed is:

1. A method, comprising:
   scanning a list of files stored in memory of a client device;
   identifying a first set of files in the list of files as one or more of new and changed since a last backup operation was performed;
   categorizing a first file in the first set of files as a file that is updated frequently;
   dividing the first file into chunks of a first size;
   categorizing a second file in the first set of files as a file that is not updated frequently;
   dividing the second file into chunks of a second size, wherein the second size is different from the first size;
   for each chunk in the first file and for each chunk in the second file, generating, by the client device, a cryptographic signature value for the chunk, wherein the cryptographic signature value is computed by using actual data of the chunk as an input to a cryptographic signature-generating algorithm which computes the cryptographic signature value;
   generating, at the client device, a first inventory including the cryptographic signatures calculated for the chunks in the first and second files;
   transmitting the first inventory from the client device to a backup server.

2. The method of claim 1, further comprising:
   receiving, at the backup server, the first inventory including the cryptographic signatures calculated for the chunks in the first and second files;
   extracting, by the backup server, the cryptographic signatures from the first inventory;
   comparing, by the backup server, the cryptographic signatures to a list containing all cryptographic signatures identifying raw data currently stored in a backup system managed by the backup server regardless of whether the raw data currently stored in the backup system was stored there by the client device or by a second client device other than the client device which generated the first inventory;
   based on the comparison step, generating a second inventory, the second inventory including the cryptographic signatures found in the first inventory and not found in the list containing all cryptographic signatures identifying actual data currently stored in the backup system;
   transmitting the second inventory from the backup server to the client device;
   receiving, at the client device, the second inventory;
   transmitting, from the client device to the backup server, every chunk having a cryptographic signature corresponding to a cryptographic signature found in the second inventory; and
   causing the chunks transmitted from the client device to the backup server to be stored in the backup system.

3. The method of claim 1, wherein the second size is larger than the first size.

4. The method of claim 3, wherein the first size is less than 1 MB and wherein the second size is less than 10 MB.

5. The method of claim 1, wherein the first file is categorized by comparing a creation timestamp of the first file with an update timestamp of the first file.

6. The method of claim 5, wherein the second file is categorized by comparing a creation timestamp of the second file with an update timestamp of the second file.

7. The method of claim 6, wherein the first file is also categorized by comparing the update timestamp of the first file with a current time.

8. The method of claim 1, wherein the first inventory further includes one or more markers that identify sizes of chunks of the first and second file.

9. A method, comprising:
   scanning a list of files stored in memory of a client device;
   identifying a first set of files in the list of files as one or more of new and changed since a last backup operation was performed;
   analyzing metadata of a first file in the first set of files;
   based on the analysis of the metadata of the first file, dividing the first file into chunks of a predetermined size;
   for each chunk in the first file, generating, by the client device, a cryptographic signature value for the chunk, wherein the cryptographic signature value is computed by using actual data of the chunk as an input to a cryptographic signature-generating algorithm which computes the cryptographic signature value;
   generating, at the client device, a first inventory including the cryptographic signatures calculated for the chunks in the first file; and
   transmitting the first inventory from the client device to a backup server.

10. The method of claim 9, further comprising:
    receiving, at the backup server, the first inventory including the cryptographic signatures calculated for the chunks in the first file;
    extracting, by the backup server, the cryptographic signatures from the first inventory;
    comparing, by the backup server, the cryptographic signatures to a list containing all cryptographic signatures identifying raw data currently stored in a backup system managed by the backup server regardless of whether the raw data currently stored in the backup system was stored there by the client device or by a second client device other than the client device which generated the first inventory;
    based on the comparison step, generating a second inventory, the second inventory including the cryptographic signatures found in the first inventory and not found in the list containing all cryptographic signatures identifying actual data currently stored in the backup system;
    transmitting the second inventory from the backup server to the client device;
    receiving, at the client device, the second inventory;
    transmitting, from the client device to the backup server, every chunk having a cryptographic signature corresponding to a cryptographic signature found in the second inventory; and
    causing the chunks transmitted from the client device to the backup server to be stored in the backup system.

11. The method of claim 9, wherein the metadata includes a file type.

12. The method of claim 11, wherein the metadata further includes a creation timestamp and an update timestamp.

13. The method of claim 11, wherein the predetermined size is determined, at least in part, based on the file type.

* * * * *